United States Patent
Manic et al.

(10) Patent No.: US 10,112,857 B2
(45) Date of Patent: Oct. 30, 2018

(54) METHOD AND EQUIPMENT FOR THE BIOLOGICAL DENITRIFICATION OF WASTE WATER

(71) Applicant: DEGREMONT, Paris la Defense (FR)

(72) Inventors: Gildas Manic, Paris (FR); Philippe Ginestet, Chateaufort (FR)

(73) Assignee: DEGREMONT, Paris la Defense (FR)

( * ) Notice: Subject to any disclaimer, the term of this patent is extended or adjusted under 35 U.S.C. 154(b) by 139 days.

(21) Appl. No.: 14/903,471

(22) PCT Filed: Jul. 4, 2014

(86) PCT No.: PCT/IB2014/062858
§ 371 (c)(1),
(2) Date: Jan. 7, 2016

(87) PCT Pub. No.: WO2015/004583
PCT Pub. Date: Jan. 15, 2015

(65) Prior Publication Data
US 2016/0145131 A1 May 26, 2016

(30) Foreign Application Priority Data
Jul. 8, 2013 (FR) ...................................... 13 56681

(51) Int. Cl.
*C02F 3/00* (2006.01)
*C02F 3/30* (2006.01)
*C02F 101/16* (2006.01)

(52) U.S. Cl.
CPC .............. *C02F 3/305* (2013.01); *C02F 3/006* (2013.01); *C02F 3/302* (2013.01);
(Continued)

(58) Field of Classification Search
None
See application file for complete search history.

(56) References Cited

U.S. PATENT DOCUMENTS 5,849,180 A * 12/1998 Sumino .................. C02F 3/087
210/150
6,129,104 A 10/2000 Ellard et al.
(Continued)

FOREIGN PATENT DOCUMENTS

FR 2725193 4/1996
FR 2954306 6/2011
(Continued)

OTHER PUBLICATIONS

Ma et al., "Improving nutrient removal of the AAO process by an influent bypass flow by denitrifying phosphorus removal," Desalination, vol. 246, 2009, pp. 534-544.

*Primary Examiner* — Chester T Barry
(74) *Attorney, Agent, or Firm* — Young & Thompson

(57) ABSTRACT

A method for biologically denitrifying waste water, includes a nitrification-denitrification sequence followed, for a first fraction of water, by a post-denitrification step during which an electron donor is injected into the first fraction, while a second fraction of water passes through a bypass, then is mixed with the first fraction downstream of the post-denitrification step; the first fraction of waste water is subjected, during the post-denitrification, to a nearly complete denitrification so as to exit the step at a nitrate [N—$NO_3$] concentration less than 4 mg/L, to minimize nitrous oxide production. The bypass rate is determined based on: a measurement of the nitrate concentration of the water upstream of the post-denitrification, the desired nitrate concentration for the mixture of the two fractions downstream of the post-denitrification treatment, and the nitrate concentration of the first fraction at the outlet of the post-denitrification, before the mixing of the two fractions.

9 Claims, 4 Drawing Sheets

(52) U.S. Cl.
CPC .. *C02F 2101/163* (2013.01); *C02F 2209/006* (2013.01); *C02F 2209/15* (2013.01); *C02F 2209/40* (2013.01)

(56) References Cited

U.S. PATENT DOCUMENTS

2008/0197074 A1\* 8/2008 Gallagher ............... C02F 1/461
                                                                                                   210/631
2012/0211417 A1 8/2012 Vegso et al.

FOREIGN PATENT DOCUMENTS

| JP | 2000-325991 | | 11/2000 |
|----|----|----|----|
| JP | 2006204967 A | \* | 8/2006 |
| JP | 2006-326589 | | 12/2006 |
| JP | 2008023485 A | \* | 2/2008 |
| JP | 2013-039576 | | 2/2013 |
| JP | 2013-046885 | | 3/2013 |

\* cited by examiner

METHOD AND EQUIPMENT FOR THE BIOLOGICAL DENITRIFICATION OF WASTE WATER

FIELD OF THE INVENTION

The invention relates to a method for the biological denitrification of wastewater, of the kind that comprises a nitrification-denitrification sequence followed, for a first fraction of the water, by a step of post-denitrification, during which an electron donor is injected into this first fraction, whereas a second fraction of the water passes through a bypass, and then is mixed with the first fraction downstream of the post-denitrification step.

The nitrification-denitrification sequence allows ammonia nitrogen to be removed by production of nitrates (nitrification) followed by production of gaseous nitrogen $N_2$ by denitrification (removal of nitrates), which consists of reduction of the nitrates to nitrites and then to nitrogen. The reactions are catalyzed and require the presence of an electron donor, in particular an external carbon source.

At wastewater treatment works, the nitrification-denitrification sequence may be carried out with spatial separation, with different dedicated zones, and/or in one and the same sequential reactor with batch operation, with aeration-stirring dissociation, and sometimes even in certain conditions simultaneously.

DESCRIPTION OF THE RELATED ART

The invention relates to a method for biological denitrification with spatial separation of nitrification and denitrification in different zones, this method being applicable to free, mixed and fixed cultures.

It is known that denitrification is accompanied not only by production of gaseous nitrogen, but also by production of nitrogen oxides, in particular nitrous oxide $N_2O$, which is a greenhouse gas whose warming potential is three hundred and twenty times higher than that of carbon dioxide $CO_2$ and whose lifetime is estimated at between 120 and 150 years.

After mixing the first fraction treated in post-denitrification and the second fraction that bypassed this post-denitrification, the wastewater must have a concentration of nitrates below a set value determined by the regulations, which may be of the order of 10 mg/L for the concentration of [N—$NO_3$].

SUMMARY OF THE INVENTION

The invention aims in particular to supply a method for the biological denitrification of wastewater that makes it possible to obtain, downstream of the treatment, a concentration of [N—$NO_3$] less than or equal to a desired set value, while avoiding or reducing the production of nitrous oxide $N_2O$.

Preferably, the invention also aims to deal with the problems of dosage of the electron donor, and of controlling the bypass flow rate.

Regarding the dosage of the electron donor, notably of external carbon, there are risks associated with underdosage as well as with overdosage.

In the case of underdosage, incomplete denitrification is created, leading to accumulation of nitrites in the treated water: these nitrites mean it is not possible to decrease the total nitrogen content TN of the final effluent, and they constitute an additional oxygen demand in the treated water (BOD and COD). Reduction of the nitrates to nitrites is energetically more efficient for the denitrifying flora involved. The result is that an excess of nitrates within the reactor relative to the available electron donor will promote utilization of the latter for reducing all the nitrates to nitrites first. Then, and only then, the nitrites will be able to be reduced to gaseous nitrogen if amounts of electron donor are still present.

Besides the extra cost caused by a surplus of electron donor, overdosage leads to an increase in the water's chemical and biological oxygen demand, at the end of treatment.

Management of the bypass flow rate is also tricky.

If the bypass flow rate is excessive, bypass generates nitrogen excess in the wastewater after treatment, generally constituting industrial waste, which must satisfy the regulatory concentrations for total nitrogen.

Underestimation of the bypass flow rate, or absence of bypass, leads to needless consumption of electron donor, in particular of methanol, connected with treatment of the dissolved oxygen present in the water and neutralizing a proportion of the electron donor injected, notably carbon-containing substrate.

There are also difficulties connected with metrology, notably regarding the sensors of N—$NO_3$ concentration, which, according to the state of the art, have an uncertainty of the order of 0.5 mg/L to 1 mg/L, which is close to concentration ranges from 0.5 mg/L to 3 mg/L, which may be desired. As a result, there is a large relative error connected with the measurement, which makes effective control of the injection of electron donor difficult.

According to the invention, the method for the biological denitrification of wastewater of the type defined above is characterized in that:
the first fraction of the wastewater is submitted, during post-denitrification, to almost complete denitrification in order to exit the step with a concentration of nitrates [N—$NO_3$] below 4 mg/L, to minimize the production of nitrous oxide $N_2O$,
and the bypass rate is determined from:
measurement of the concentration of nitrates [N—$NO_3$] in the water upstream of post-denitrification,
the concentration of nitrates [N—$NO_3$] desired for the mixture of the two fractions downstream of the post-denitrification treatment,
and the concentration of nitrates [N—$NO_3$] in the first fraction leaving post-denitrification, before mixing of the two fractions.

Preferably, the first fraction of the wastewater leaves the post-denitrification step with a concentration of nitrates [N—$NO_3$] below 2 mg/L.

According to the invention, the almost complete denitrification carried out during post-denitrification limits the production of nitrous oxide. The percentage of reduced nitrates is increased and the $N_2O/N_2$ production ratio decreases so that nitrogen $N_2$ becomes the main gas produced.

After mixing the two fractions, the concentration of nitrates in the water leaving the treatment is higher than in the first fraction leaving post-denitrification, but remains less than or equal to the set value desired for the water leaving the treatment.

If, contrary to the invention, partial denitrification, corresponding to the set value desired for the water leaving the treatment, had been carried out on all of the wastewater or on most of the wastewater, the production of nitrous oxide $N_2O$ would have been greater than according to the method of the invention.

Advantageously, the injection of electron donor is controlled by:
on the one hand, measuring the concentration of nitrates [N—NO$_3$] in the water upstream of post-denitrification, and measuring the flow rate of the wastewater,
and on the other hand, estimating the nitrogen-containing burden ([N—NO$_3$] concentration) in the first fraction at outlet from post-denitrification, before mixing the two fractions, this estimate being calculated as a function of measurement of the concentration of nitrates [N—NO$_3$] at outlet from the treatment after mixing the two fractions, and of the bypass rate used,
the estimated or measured value of the electron donor flow rate is compared with a desired set value, and the flow rate of electron donor injected is altered to reduce the difference between estimated value and desired value.

According to the invention, the almost complete denitrification carried out during post-denitrification supplies, at the outlet, water whose low concentration of nitrates cannot be measured accurately by the available sensors. In contrast, when the two fractions have been mixed together, the concentration of nitrates is higher and can be measured with satisfactory accuracy. From this value and the bypass rate, it is possible to deduce the concentration of nitrates in the first fraction at outlet from post-denitrification, which corresponds to a kind of virtual measurement.

The concentration of nitrates in the first fraction at outlet from post-denitrification is advantageously estimated using fuzzy logic to define a range of possible values.

Preferably, the bypass flow rate is controlled by determining a value of the bypass rate, according to the concentrations of nitrates desired at the different places of the treatment, and it is compared with the upper and lower limit values, to adopt a set value that is within the limits imposed. Depending on the comparison of the set value with a measured value, an element altering the bypass flow rate is acted upon in order to reach the set value. This set value is selected to limit the loss of electron donor bound to the dissolved oxygen.

The electron donor may be a carbon source selected from methanol, acetic acid, glycerol or a carbon-containing compound that disperses easily in a denitrifying reactor.

Generally, the concentration of nitrates and dissolved oxygen in the water are measured upstream of post-denitrification to estimate the equivalent nitrogen-containing burden.

Advantageously,
the inlet flow rate of wastewater to be treated is measured before bypass,
the electron donor flow rate for ensuring denitrification of the fraction not bypassed is calculated taking into account the bypass rate,
the concentration of NO$_3$ at outlet from post-denitrification, before mixing with the bypassed fraction, is estimated from measurement of the concentration of NO$_3$ downstream of mixing of the bypassed fraction and the fraction that has undergone post-denitrification, and the bypass rate,
control of the bypass flow rate is provided to limit the loss of carbon-containing substrate bound to the dissolved oxygen.

The invention also relates to equipment for implementing the method defined above, characterized in that it comprises devices for measuring flow rate for:
measuring the flow rate FIT Qe at outlet from an aerated unit;
measuring the bypass flow rate, either with direct instrumentation, or by estimation based on the inlet flow rate FIT Qe and the feed rate for post-denitrification;
measuring the inlet flow rate of the post-denitrification unit, either by instrumentation, or by estimation based on the inlet flow rate and the bypass flow rate FIT Qbp;
a device for regulating the bypass flow rate:
systems for measuring water quality, with a suitable transmitter;
a device for regulating the electron donor flow rate.

BRIEF DESCRIPTION OF THE DRAWING FIGURES

Apart from the arrangements disclosed above, the invention consists of a certain number of other arrangements that will be considered more explicitly below in connection with an embodiment example described with reference to the appended drawings, but which is not in any way limiting. In these drawings.

DETAILED DESCRIPTION OF THE INVENTION

Figure 1:
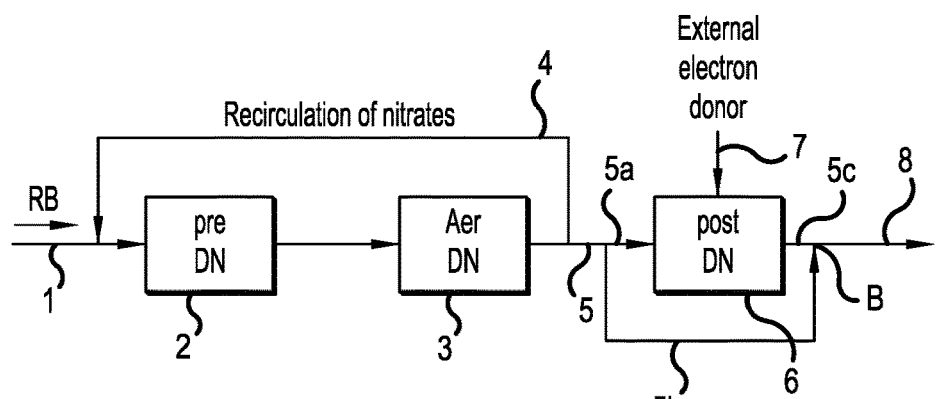
FIG. 1 is a block diagram of a method of denitrification according to the invention.

Referring to FIG. 1, this shows a block diagram of the method for the biological denitrification of wastewater RB arriving via a pipe 1. The water RB is submitted to predenitrification or pre DN in a tank 2, and to a nitrification sequence in an aerated tank 3. Recirculation 4 of the nitrates is provided between the outlet of tank 3 and the inlet of tank 2.

The water from tank 3 is conveyed by a pipe 5 to a post-denitrification, or post DN, tank 6.

A first fraction of the water is introduced via a pipe 5a into tank 6 where it undergoes the post DN treatment, during which an external electron donor, in particular a carbon source such as methanol, is injected into the fraction, as indicated by arrow 7.

A second fraction of the water passes through a bypass 5b and is not submitted to the post DN treatment in tank 6. The first fraction and the second fraction come back together and are mixed at B, downstream of the treatment tank 6. The mixture is discharged via a pipe 8.

The concentration of nitrates [N—NO$_3$] after mixing, in pipe 8, must be below a set value, for example 10 mg/L. Such a concentration can be measured with satisfactory precision by the sensors of the prior art, whose uncertainty is of the order of 0.5 to 1 mg/L. However, for lower concentrations, of the order of 3 or 4 mg/L, the measurement uncertainty becomes too great.

Denitrification, in the post DN step, is accompanied by production of nitrous oxide $N_2O$, which should be limited or suppressed.

According to the invention, the post-denitrification carried out in tank 6 corresponds to almost complete denitrification so that the fraction leaving via pipe 5c has a concentration [N—$NO_3$] below 4 mg/L. This particularly thorough denitrification makes it possible to reduce the production of nitrous oxide $N_2O$, which would not be the case if incomplete or partial denitrification had been applied to all of the wastewater. The set value for [N—$NO_3$] concentration at outlet from post DN is designated $CNNO_3$ pdn.

The set value for the concentration of the mixture in pipe 8 is designated $CNNO_3$ s.

Measurement of the concentration [N—$NO_3$] in the water upstream of post DN 6 is provided by a sensor 9 (FIG. 2), whose measurement is designated AIT $NO_3$ e.

Figure 3:
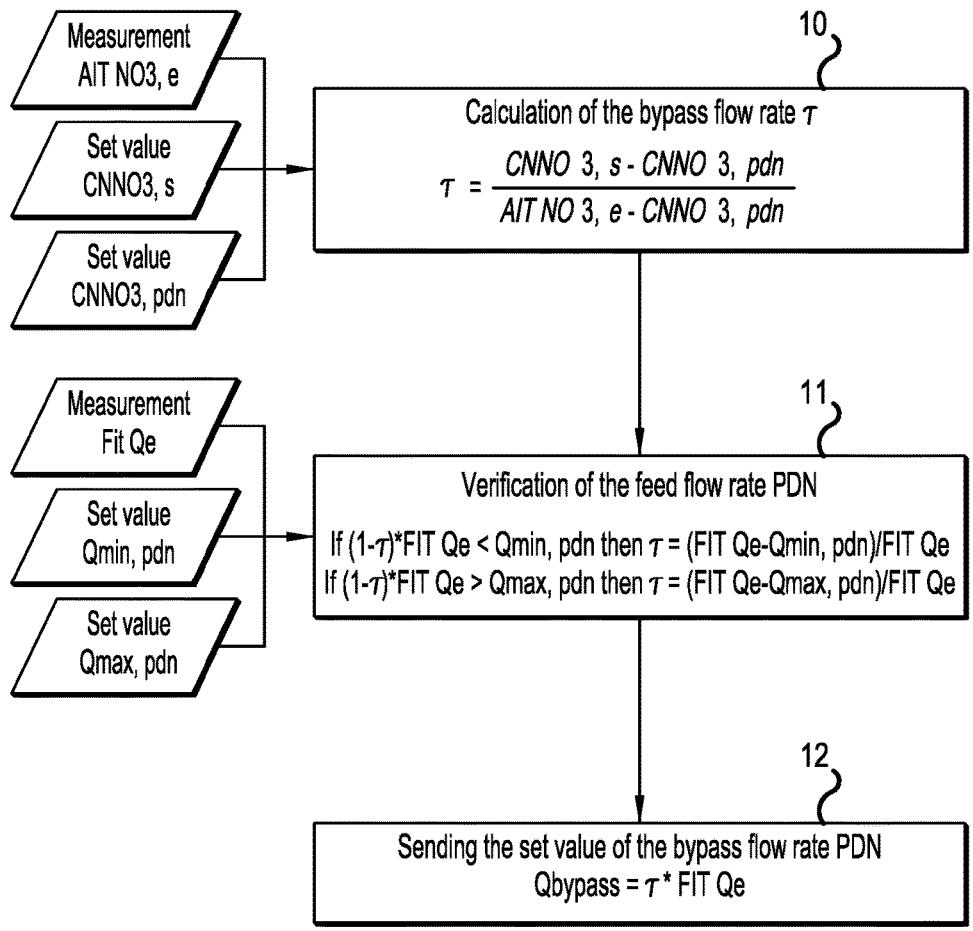
FIG. 3 is a flow chart illustrating determination of the set value for bypass flow rate.

As illustrated in FIG. 3, in box 10, the bypass rate is determined by the relation:

$$\tau = (CNNO_3 s - CNNO_3 pdn)/(AITNO_3 e - CNNO_3 pdn)$$

This bypass rate can be used for determining a theoretical feed rate of post DN 6 via pipe 5a, as explained below:
  the total flow rate of the wastewater, upstream of the bypass 5b, is measured by a sensor 10 (FIG. 2), which gives the flow rate designated FIT Qe;
  the feed rate of post DN 6 is equal to $(1-\tau)$ times the total flow rate, or $(1-\tau) \times$ FIT Qe.

This calculated feed rate for post DN must be compared with the requirements of the equipment, which allow a minimum flow rate Qmin and a maximum flow rate Qmax to be determined for post DN 6, as shown in box 11 in FIG. 3.

If the bypass flow rate given by box 10 is lower than Qmin, then it is this value of Qmin that is adopted for the bypass flow rate so that the rate becomes equal to $\tau$=(FIT Qe−Qmin pdn)/FIT Qe. Similarly, if the bypass flow rate given by box 10 is greater than Qmax pdn, the bypass rate is put equal to $\tau$=(FIT Qe−Qmax pdn)/FIT Qe.

Finally, the set value of bypass flow rate is supplied by box 12 (FIG. 3) and is taken into account by a controller 13 (FIG. 2) of the bypass flow rate, which receives the measurements supplied by the sensors 9, 10, as well as by a sensor 14 installed on pipe 8 for mixture outlet, and supplying the concentration of nitrates designated AIT $NO_3$ s.

The bypass flow rate may be provided by a pump 15 (FIG. 2) installed on pipe 5b and driven by an adjustable-speed motor 16. The flow rate in the bypass pipe 5b is measured by a sensor 17 and the value of the flow rate is designated FIT Qbp. This measurement is transmitted to the controller 13, which compares the set value, in box 12 in FIG. 3, with the measured value supplied by sensor 17. The controller 13 consequently controls the speed of motor 16 either to increase the flow rate in pipe 5b if the measured value is lower than the set value, or to reduce the speed of motor 16 if the measured value is higher than the set value.

Management of the bypass flow rate by the controller 13 makes it possible to avoid:
  overestimating the bypass flow rate which, if it is excessive, generates nitrogen excess in the discharge from the treatment equipment via pipe 8;
  underestimating the bypass flow rate, which, if it is insufficient, leads to needless consumption of electron donor in post DN 6, in particular needless consumption of methanol, connected with treatment of the dissolved oxygen present in the wastewater and neutralizing a proportion of the electron donor injected, notably carbon-containing substrate.

Figure 2:
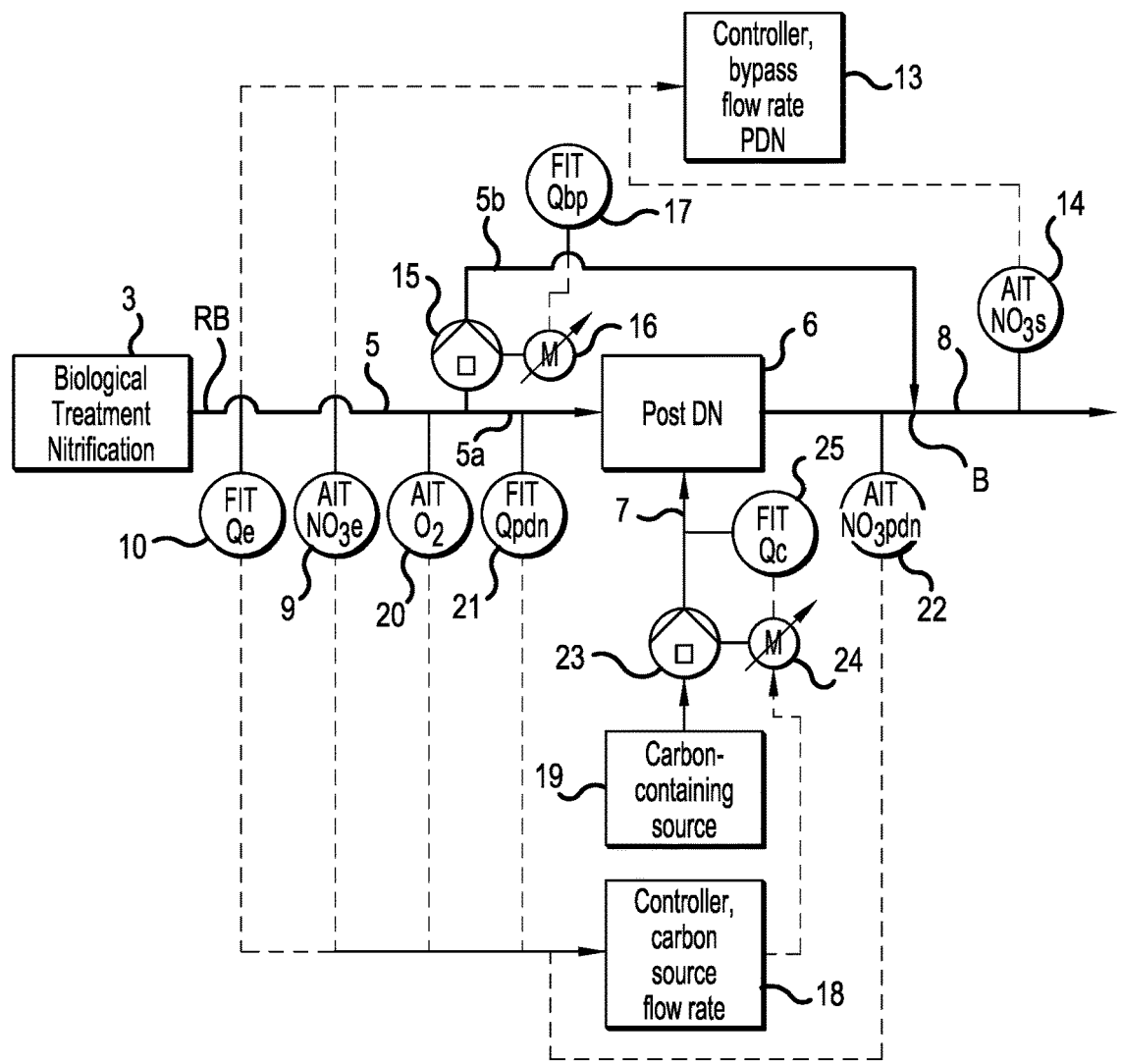
FIG. 2 is a block diagram of equipment for implementing the method.

Injection of electron donor is controlled by a controller 18 (FIG. 2). In most cases the electron donor comes from an external carbon source 19, i.e. not supplied by the wastewater. The carbon source may be methanol, acetic acid, glycerol, or any carbon-containing compound that can be dispersed easily in the wastewater submitted to post DN 6.

The controller 18 receives:
  the measurements taken by sensors 9 and 10,
  the measurement of the concentration of dissolved oxygen $O_2$ in the raw water arriving via pipe 5, performed by a sensor 20 giving the value AIT $O_2$,
  as well as the measurement of the flow rate of liquid entering post DN supplied by a sensor 21, which gives the quantity FIT Q pdn.

The concentration of nitrates at outlet from reactor 6 and upstream of the branching B of the bypass on the pipe is estimated by the calculation as presented in connection with FIG. 4, and in box 30 described later. A "virtual" sensor 22 is shown with dashes at outlet from reactor 6 as a reminder that controller 18 takes into account a value AIT $NO_3$ pdn of the concentration of nitrates at outlet from post DN.

Injection 7 of electron donor may be provided by a pump 23 driven by a variable-speed motor 24 operated by controller 18. A sensor 25 measures the flow rate FIT Qc of electron donor injected at 7. The measurement of sensor 25 is sent to the controller 18.

Figure 4:
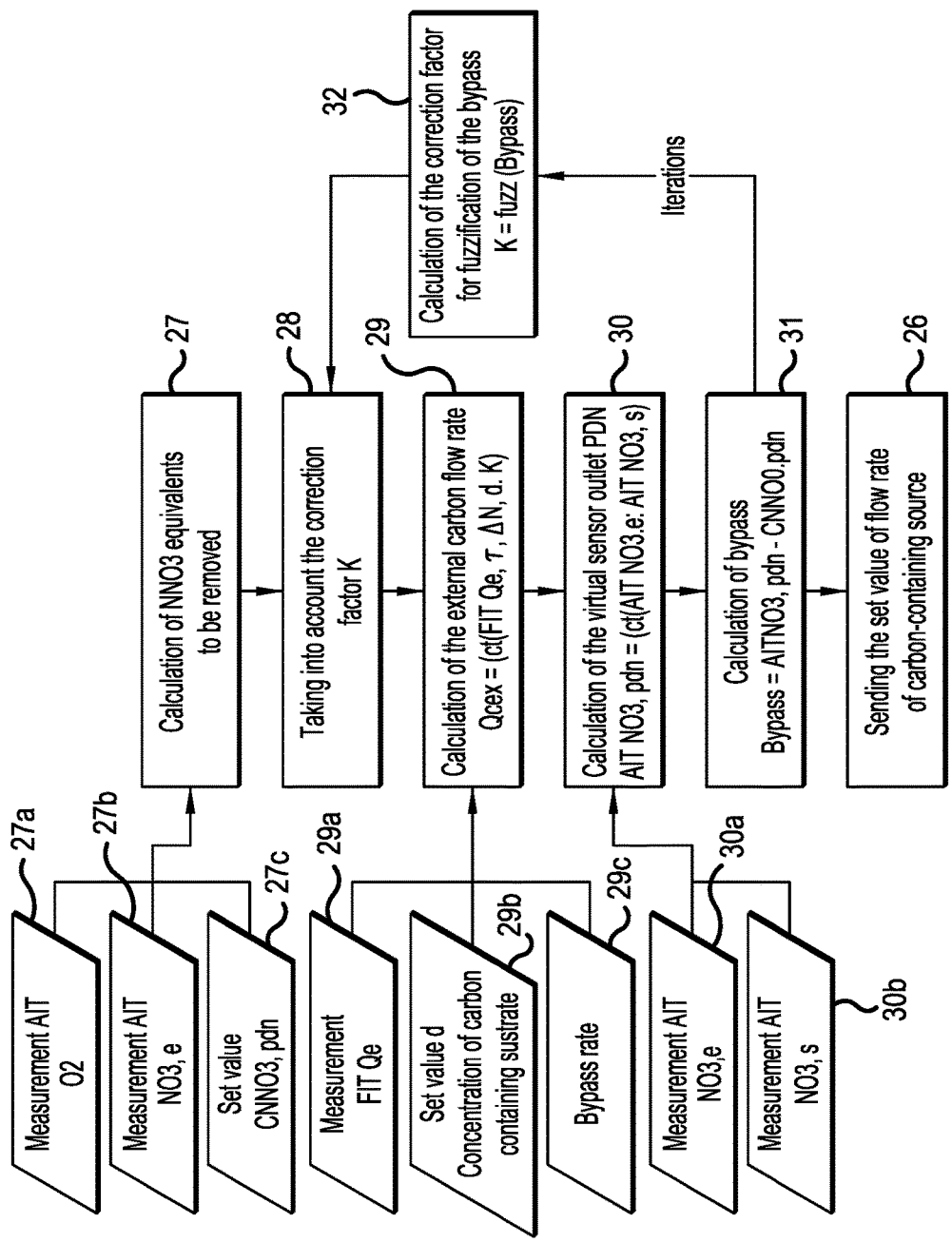
FIG. 4 is a flow chart illustrating determination of the set value for electron donor flow rate.

The set value of electron donor flow rate, notably from the carbon-containing source 19, is determined by the controller 18 according to the flow chart illustrated in FIG. 4, the calculated set value of flow rate being supplied in box 26.

The starting box 27 provides calculation of the $NNO_3$ equivalents to be removed from the wastewater. This calculation is based on the following measurements:
  measurement AIT $O_2$, of the concentration of dissolved oxygen, supplied by sensor 20, as indicated in box 27a;
  measurement AIT $NO_3$ e of the concentration of nitrates, supplied by sensor 9, as indicated in box 27b;
  and set value $CNNO_3$ pdn at outlet from post DN 6, as indicated in box 27c.

The result of the calculation in box 27 is transferred to a box 28, which takes into account a correction factor K specified later.

The corrected value of the $NNO_3$ equivalents to be removed is transferred from box 28 to a box 29 that provides calculation of the electron donor flow rate, external carbon in the example considered, to be supplied to ensure the desired removal of $NNO_3$ equivalents. The calculation in box 29 is carried out using the wastewater flow rate FIT Qe supplied by a box 29a connected to sensor 10, the set value of electron donor concentration supplied by box 29b and the bypass rate appearing in box 29c and supplied by box 12 in FIG. 3.

The value of the electron donor flow rate calculated by box 29 is transferred to a box 30 for calculating the concentration of nitrates AIT $NO_3$ pdn at outlet from post DN 6. This calculation is performed using the measurement AIT $NO_3$ e of the concentration of nitrates in the wastewater to be treated, said measurement being supplied to a box 30a by sensor 9 (FIG. 2), as well as using the measurement AIT $NO_3$ s of the concentration of nitrates in the outlet pipe 8, said measurement being supplied to a box 30b by sensor 14 (FIG. 2).

The value calculated by box 30 is transferred to box 31, which calculates the deviation between the concentration of nitrates AIT NO₃ pdn estimated at outlet from post DN, and the set value CNNO₃ pdn. The calculated deviation is sent to a box 32, which calculates the correction factor K by fuzzy logic. The calculation from box 32 is sent to box 28 so that the factor K=fuzz (deviation) is taken into account.

A flow rate set value is finally obtained in box 26, after several iterations from box 31 to box 32.

The method of the invention makes it possible to overcome the difficulties connected with metrology, presented below.

The estimate of the "equivalent nitrogen-containing burden" at inlet of the post DN step 6 is subject to uncertainties, because for this it is necessary to know the concentrations of N—NO₃, N—NO₂ and dissolved oxygen.

Now, at present there are no reliable means for knowing the concentrations of nitrites N—NO₂.

According to the invention, almost complete denitrification of the first fraction makes it possible to guard against the formation of nitrites.

In contrast, the concentrations of nitrates N—NO₃ and of dissolved oxygen are measured with sufficient accuracy in the wastewater upstream of post DN 6.

Estimation of the nitrogen-containing burden at outlet from post DN, which would make it possible to correct the regulation of injection of electron donor, in particular of external carbon, is tricky because of the uncertainty of the N—NO₃ sensors, these uncertainties being of the order of 0.5 mg/L to 1 mg/L.

According to the invention, the nitrogen-containing burden at outlet from post DN is obtained by a virtual measurement, resulting from a calculation based on the bypass rate, and of the concentration of nitrates of the mixture of the two fractions. This concentration is higher than at outlet from post DN and allows a measurement whose relative accuracy is improved.

The invention can permanently maximize the purifying potential of post-denitrification with:
 minimization of the production of N₂O, guaranteeing, whatever the objective fixed for discharge of N—NO₃, thorough denitrification at the works in question;
 control of the amount of electron donor, notably external carbon, used for denitrification, this amount being determined on the one hand by measurement upstream of the denitrification, and on the other hand by a virtual measurement downstream, calculated as a function of measurement at outlet from the equipment and of the bypass rate used, serving for correction of control by processing the signal using fuzzy logic;
 control of the bypass flow rate to limit the loss of electron donor, notably carbon-containing substrate, bound to the dissolved oxygen.

The equipment for implementing the method is made up of the following elements:
 three flow rate measuring devices for:
  measuring the flow rate FIT Qe at outlet from the aerated unit by a sensor 10;
  measuring the bypass flow rate, either with direct instrumentation using sensor 17 giving the flow rate FIT Qbp, or by estimation based on the inlet flow rate FIT Qe and the feed rate of post DN supplied by a sensor 21 giving FIT Qpdn;
  measuring the flow rate at inlet of the post DN unit, either by direct instrumentation with sensor 21 giving FIT Qpdn, or by estimation based on the inlet flow rate FIT Qe and the bypass flow rate FIT Qbp;
 a device for regulating the bypass flow rate:
  either by change of frequency on the motor or motors 16 of pump 15 of the bypass flow rate, or of the feed rate for post-denitrification, if these flow rates are provided by pumping;
  or by varying the opening of a device for regulating the flow rate of the control valve type or any other device for regulating the flow rate;
 several systems for measuring water quality, with a suitable transmitter:
  a nitrate probe or analyzer 9 situated at the outlet of the aerated reactor, or tank 3, and giving the concentration AIT NO₃ e;
  a probe or analyzer 20 of dissolved oxygen situated at the outlet of the aerated reactor and giving the concentration AIT O₂;
  a nitrate probe or analyzer 14 situated at the outlet from the equipment after mixing the two fractions and giving the concentration AIT NO₃ s;
  an electron donor metering pump 23, notably from an external carbon source 19;
  a sensor 25 for measuring the flow rate of the electron donor solution sent to reactor 6 for post DN;
  a calculating means, integrated in the controller 18, for performing virtual measurement of the performance of reactor 6 for post DN based on the concentration AIT NO₃ s, the bypass rate and the concentration at inlet AIT NO₃ e.

When commissioning the control system, it is necessary to fix the following set values:
 set value CNNO₃ s of the concentration of nitrates N—NO₃ at outlet from the equipment, after mixing the two fractions leaving reactor 6 for post DN, and from the bypass. This set value is adjusted as a function of the discharge objectives of the equipment;
 set value CNNO₃ pdn of the concentration of nitrates N—NO₃, at outlet from reactor 6 for post DN. This set value must not exceed 4 mg/L and should preferably be below 2 mg/L, to guard against a risk of incomplete denitrification;
 the minimum Qmin pdn and maximum Qmax pdn flow rates for feed of reactor 6 for post DN, it being necessary to adjust these flow rates according to the physical parameters connected with the method used, notably rate for the biofilters, residence time for the membrane bioreactors designated by the abbreviation MBBR, or for activated sludge.

The operation of the method and of the equipment will be clear from the explanations given above.

The bypass flow rate controller 13 calculates the set value of bypass flow rate $Q_{bypass}$ based on the physical measurements described above and applying the flow chart in FIG. 3. The flow rate of pump 15 is adjusted based on this set value.

Calculation of the set value of electron donor flow rate, notably of external carbon, by controller 18, is performed in several steps:
 a first calculation of the required electron donor flow rate is performed based on the measurement of the nitrogen flow at inlet based on the flow rate FIT Qpdn supplied by sensor 21 and the concentration of nitrates AIT NO₃e supplied by sensor 9;

a virtual measurement AIT $NO_3pdn$ of the concentration of nitrates at outlet from reactor 6 is calculated according to the measurement AIT $NO_3s$ supplied by sensor 14, the measurement at inlet AIT $NO_3e$ supplied by sensor 9, and the bypass rate;

a second calculation of the electron donor flow rate is performed by the controller 18, correcting the result obtained as a function of the difference between the virtual measurement calculated at outlet from reactor 6 for post DN, and the desired set value $CNNO_3pdn$. The calculation is performed by the controller 18 in the form of ranges of values using fuzzy logic, in order to guard against uncertainties connected with metrology. The flow chart in FIG. 4 illustrates this calculation.

Figure 5:
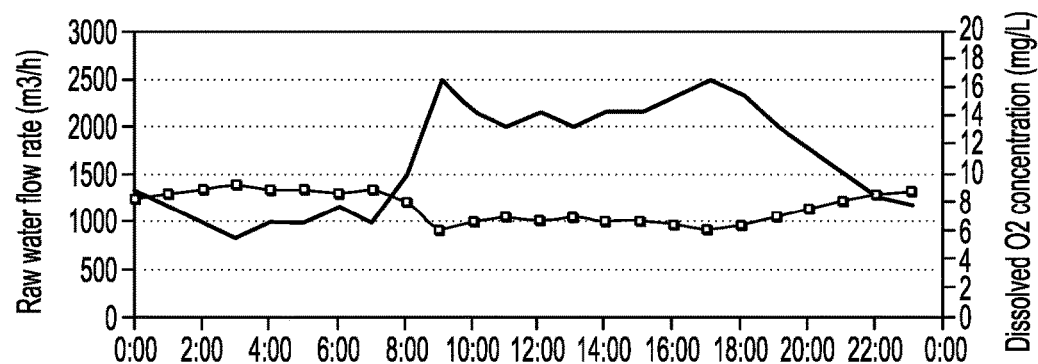
FIG. 5 is a graph showing the variation in the flow rate of raw water and content of dissolved oxygen, plotted on the ordinate, as a function of time, plotted on the abscissa, for one day.
Figure 6:
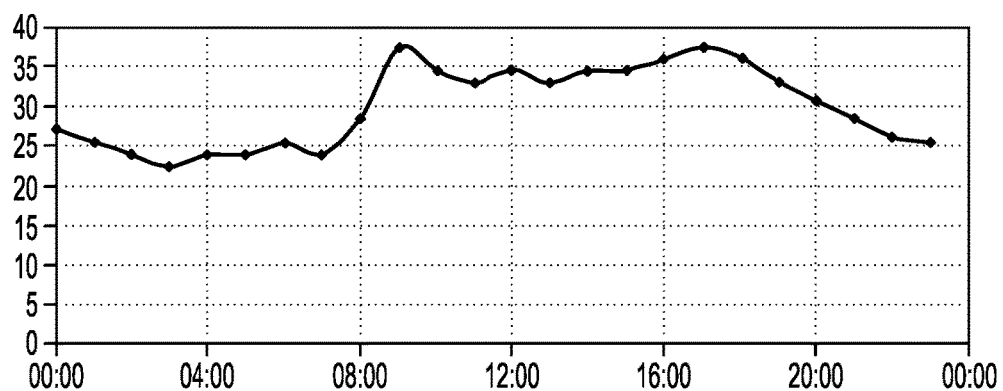
FIG. 6 illustrates the daily profile of the concentration [N—NO$_3$] plotted on the ordinate, at inlet to post-denitrification, time being plotted on the abscissa.

A comparison between a method of denitrification with conventional regulation and the method of the invention was carried out by the calculation for a case study according to FIGS. 5 and 6.

FIG. 5 illustrates an example of a daily profile of flow rate of raw water represented by a thick solid line, and of dissolved oxygen represented by a thinner line with spaced squares. The flow rate of raw water is plotted on the ordinate on the left and is expressed in cubic meters per hour ($m^3/h$) whereas the concentration of dissolved oxygen is plotted on the ordinate on the right and is expressed in mg/L. Time expressed in hours is plotted on the abscissa.

FIG. 6 illustrates the daily profile of concentration of nitrates [$N-NO_3$] at inlet of post DN, the values being plotted on the ordinate on the left and expressed in mg/L. Time is plotted on the abscissa in hours.

The example relates to treatment works for biofiltration of municipal wastewater, with a treatment capacity of 200 000 equivalent inhabitants, receiving an average flow rate of 39 600 $m^3$/day. The objective for nitrogen treatment is fixed as total nitrogen TN, at works outlet, at TN 15 mg/L. The set value intended for treatment of nitrates is fixed at [$N-NO_3$]=10 mg/L. The carbon-containing substrate used is methanol.

Steps for primary treatment and secondary biological treatment with aerated biofilters treating carbon and nitrogen are installed before the post DN step. As can be seen from FIG. 5, the concentration of dissolved oxygen increases in periods of low load, in connection with the aeration of the aerated biofiltration steps.

As effluent with equal content of nitrates, two scenarios were investigated:
Case 1: conventional regulation using measurement of nitrates at inlet of post DN. The bypass circuit is not used.
Case 2: implementation of regulation according to the method of the invention using automatic calculation of bypass rate and inlet/outlet measurements of concentration of nitrates with correction by fuzzy logic.

In Case 1, the operator passes the entire flow of water to be treated via the post DN step, adjusting the controls so as to obtain the concentration [$N-NO_3$] at 10 mg/L, through partial denitrification corresponding to a mean value of 60% of efficiency or reduction.

In Case 2, the operator makes use of the possibilities offered by the bypass to effect complete denitrification on a fraction of the effluent (94% denitrification efficiency) and mix the bypass stream with the water thus treated to obtain an average concentration [$N-NO_3$] at discharge of 10 mg/L.

The calculations reveal that, according to the invention (Case 2), the gain in methanol (decrease of consumption) obtained is 6%, relative to Case 1, with the following observations:
although the denitrification carried out in Case 2 on the fraction submitted to this treatment is more thorough, which when compared with a lower efficiency leads to an increase in consumption of electron donor (external carbon), the consumption of electron donor is lower than for Case 1, as the flow of dissolved oxygen sent to the reactor for post DN is reduced;
the quality at discharge in Case 1 is random because the concentration of nitrites, not measured, is likely to be high since the denitrification carried out is incomplete;
emission of greenhouse gases in Case 1 is high because the nitrate is not fully reduced to gaseous $N_2$, which leads to considerable production of nitrous oxide $N_2O$;
the conventional regulation in Case 1 was envisaged assuming absence of perturbations on the measurement at inlet, which remains hypothetical as feedback is not possible.

The invention can be applied to all types of reactor 6 for post DN, notably with reactors:
with free cultures (activated sludge, membrane bioreactors);
with fixed cultures (biofilters, biodisks, submerged bacterial beds, MBBR, etc.);
with mixed cultures (IFAS, which is a biological method with mixed culture which combines treatment of carbon by a free culture, and treatment of nitrogen by a fixed culture).

The treatment according to the method of the invention may be positioned downstream of an aerated reactor consisting of:
a free culture (activated sludge, membrane bioreactors, batch reactors);
a fixed culture (biofilters, biodisks, submerged bacterial beds, MBBR);
a mixed culture (IFAS).

The invention claimed is:

1. A method for the biological denitrification of wastewater that comprises a nitrification step followed by a denitrification step, for a first fraction of the water, by a post-denitrification step during which an electron donor is injected into this first fraction, whereas a second fraction of the water passes through a bypass, and then is mixed with the first fraction downstream of the post-denitrification step, wherein:
the first fraction of the wastewater is submitted, during post-denitrification, to almost complete denitrification in order to exit the step with a concentration of nitrates [$N-NO_3$] below 4 mg/L, to minimize the production of nitrous oxide $N_2O$,
and the bypass rate is determined from:
measurement of the concentration of nitrates [$N-NO_3$] in the water upstream of post-denitrification,
the desired concentration of nitrates [$N-NO_3$] for the mixture of the two fractions downstream of the post-denitrification treatment,
and the concentration of nitrates [$N-NO_3$] in the first fraction at outlet from post-denitrification, before mixing the two fractions.

2. The method as claimed in claim 1, wherein the first fraction of the wastewater leaves the post-denitrification step with a concentration of nitrates [$N-NO_3$] below 2 mg/L.

3. The method as claimed in claim 1, wherein the injection of electron donor used is controlled:
  by measuring the concentration of nitrates [N—NO$_3$] in the water upstream of post-denitrification, and by measuring the flow rate of the wastewater,
  and by estimating the nitrogen-containing burden [N—NO$_3$] concentration of the first fraction at outlet from post-denitrification, before mixing the two fractions, said estimate being calculated as a function of measurement of the concentration of nitrates [N—NO$_3$] at treatment outlet after mixing the two fractions, and of the bypass rate used,
  the estimated or measured value of the electron donor flow rate is compared with a desired set value, and the flow rate of electron donor injected is altered to reduce the difference between estimated value and desired value.

4. The method as claimed in claim 3, wherein the concentration of nitrates [N—NO$_3$] of the first fraction at outlet from post-denitrification is estimated using fuzzy logic to define a range of possible values.

5. The method as claimed in claim 1, wherein the bypass flow rate is controlled by determining a value of the bypass rate, depending on the concentrations of nitrates desired at the various places of the treatment, and is compared with the upper and lower limit values (Qmax pdn, Qmin pdn), to adopt a set value that is within the limits imposed, and depending on the comparison of the set value adopted against a measured value, an element is acted upon, altering the bypass flow rate in order to reach the set value.

6. The method as claimed in claim 1, wherein the electron donor is a carbon source selected from methanol, acetic acid, glycerol or a carbon-containing compound that disperses easily in a denitrifying reactor.

7. The method as claimed in claim 1, wherein measurement of the concentration of nitrates [N—NO$_3$] and measurement of dissolved oxygen in the water upstream of post-denitrification are performed for estimating the equivalent nitrogen-containing burden.

8. The method as claimed in claim 1, wherein:
  measurement of the inlet flow rate of wastewater to be treated is performed before bypass,
  the electron donor flow rate for ensuring denitrification of the fraction not bypassed is calculated taking into account the bypass rate,
  the concentration of NO$_3$ at outlet from post-denitrification, before mixing with the bypassed fraction, is estimated based on measurement of the concentration of NO$_3$ downstream of mixing of the bypassed fraction and of the fraction that underwent post-denitrification, and of the bypass rate,
  control of the bypass flow rate being provided to limit the loss of carbon-containing substrate bound to the dissolved oxygen.

9. An installation for implementing the method as claimed in claim 1, which comprises
  flow rate measuring devices for:
    measurement of the flow rate FIT Qe at outlet from an aerated unit;
    measurement of the bypass flow rate FIT Qbp, either with direct instrumentation, or by estimation based on the inlet flow rate FIT Qe and the feed rate for post-denitrification;
    measurement of the inlet flow rate of the post-denitrification unit, either by instrumentation, or by estimation based on the inlet flow rate and the bypass flow rate FIT Qbp;
  a device for regulating the bypass flow rate;
  systems for measuring water quality, with a suitable transmitter, and
  a device for regulating the electron donor flow rate.

* * * * *